United States Patent
Bhandari et al.

(10) Patent No.: US 10,717,354 B2
(45) Date of Patent: Jul. 21, 2020

(54) FUEL TANK ISOLATION VALVE WITH SINGLE SEAL, IMPROVED AXIS ALIGNMENT AND ROBUST LEAK PROOF SOLENOID

(71) Applicants: Kabir Bhandari, New Delhi (IN); Amardip Kumar, Gurgaon (IN); Torsten Gerlich, Bensheim (DE); Varun Kumar, Gurgaon (IN); Krishan Kant Sharma, Gurgaon (IN); Sahil Singla, Gurgaon (IN)

(72) Inventors: Kabir Bhandari, New Delhi (IN); Amardip Kumar, Gurgaon (IN); Torsten Gerlich, Bensheim (DE); Varun Kumar, Gurgaon (IN); Krishan Kant Sharma, Gurgaon (IN); Sahil Singla, Gurgaon (IN)

(73) Assignee: Padmini VNA Mechatronics Pvt. Ltd. (IN)

( * ) Notice: Subject to any disclaimer, the term of this patent is extended or adjusted under 35 U.S.C. 154(b) by 0 days.

(21) Appl. No.: 16/136,311

(22) Filed: Sep. 20, 2018

(65) Prior Publication Data
US 2019/0084410 A1    Mar. 21, 2019

(30) Foreign Application Priority Data
Sep. 20, 2017 (IN) .............................. 201711033396

(51) Int. Cl.
*B60K 15/035*   (2006.01)
*F02M 25/08*    (2006.01)
(Continued)

(52) U.S. Cl.
CPC .. *B60K 15/03504* (2013.01); *B60K 15/03519* (2013.01); *F02M 25/0836* (2013.01);
(Continued)

(58) Field of Classification Search
CPC ........ B60K 15/03504; B60K 15/03519; B60K 2015/03302; B60K 2015/03296;
(Continued)

(56) References Cited

U.S. PATENT DOCUMENTS 5,156,178 A * 10/1992 Harris .............. B60K 15/03519
123/516
6,289,929 B1   9/2001 Takeuchi et al.
(Continued)

*Primary Examiner* — John Bastianelli

(57) ABSTRACT

A fuel tank isolation valve 10, wherein, the shaft 18 is assembled coaxially inside hole 42 of moving plunger 46 of seal sub assembly 16 and then flow limiter 22 is guided over the shaft 18 through guiding hole 34 to maintain sealing seat 36 in parallel with respect to the sealing surface 38 of rubber seal 44 and avoid misalignment of flow limiter 22 with respect to sealing surface 38 during and after the operation; the sealing seat 36 of flow limiter 22 on the sealing surface 38 of the rubber seal 44 fixed into moving plunger 46 of seal sub assembly 16 performs the over pressure relief function; the sealing surface 40 of rubber seal 44 fixed into moving plunger 46 of seal sub-assembly 16 is resting on surface 48 of nozzle body 20 to perform over vacuum relief function; and the rubber seal 44 assist both over pressure relief (OPR) and over vacuum relief (OVR) function.

6 Claims, 11 Drawing Sheets

(51) Int. Cl.
*F16K 31/06* (2006.01)
*F16K 17/196* (2006.01)

(52) U.S. Cl.
CPC ........ *F16K 17/196* (2013.01); *F16K 31/0655* (2013.01); *F02M 2025/0845* (2013.01); *Y10T 137/86324* (2015.04)

(58) Field of Classification Search
CPC .............. F16K 31/0655; F16K 17/196; F02M 25/0836; F02M 2025/0845; Y10T 137/86324
USPC .............. 251/129.03; 137/587; 123/516, 520
See application file for complete search history.

(56) References Cited

U.S. PATENT DOCUMENTS

| | | | |
|---|---|---|---|
| 6,450,152 B1 * | 9/2002 | Everingham | F02M 25/0836 123/516 |
| 6,668,807 B2 | 12/2003 | Weldon et al. | |
| 6,843,271 B2 * | 1/2005 | Weldon | F16K 24/04 123/516 |
| 8,944,100 B2 * | 2/2015 | Pifer | F16K 17/0413 137/599.11 |

* cited by examiner

FUEL TANK ISOLATION VALVE WITH SINGLE SEAL, IMPROVED AXIS ALIGNMENT AND ROBUST LEAK PROOF SOLENOID

FIELD OF THE INVENTION

The present invention relates to an improved fuel tank isolation valve. More specifically, the invention provides a system to incorporate over pressure relief (OPR) and over vacuum relief sealing (OVR) to eliminate the misalignment and customize sealing with lesser number of parts.

BACKGROUND OF THE INVENTION

Hybrid cars run most of the times with the electrical power and the combustion engine is idle. Since fuel tank is a closed system, thus in general due to evaporation of stored fuel it results in positive pressure inside the fuel tank. Moreover, it is necessary for vehicles to maintain an elevated pressure in the fuel tank to suppress the rate of fuel vapor generation and to minimize hydrocarbon emissions to the atmosphere. The most obvious solution, to overcome the problem is to provide a fuel tank isolation valve (FTIV) coupled to fuel tank to control fuel tank venting. The fuel tank isolation valve (FTIV) may be located in a conduit between a fuel tank and a fuel vapor canister in an evaporative emission control system. It opens automatically when the pressure exceeds protection limits and valve is electrically actuated at the time of re-fuelling.

A fuel tank isolation valve (FTIV) includes, a housing sub-assembly which is generally circular in shape and includes an electrically controlled solenoid valve, a compression spring fixed inside the housing sub assembly to perform over—vacuum relief function, a seal sub-assembly, a guiding shaft coupled with seal sub-assembly for inline guiding of flow limiter, a nozzle body with mounting flanges which is mounted over housing sub-assembly to be connected to the fuel tank and canister of the vehicle, a compression spring fixed over flow limiter to perform over-pressure relief function and a cover which will be mounted over nozzle body to close the valve and maintains the installation height of the compression spring for over-pressure relief function.

In specific application, like in hybrid cars, as the cars drive without the combustion engine running, thus, the gasoline in the tank can evaporate and create a pressure increase in the tank which is controlled by fuel tank isolation valve (FTIV). In such instances the compression spring fixed over the flow limiter allows flow limiter seal to open and release the excess vapors to the canister and maintain the vehicle tank pressure in a protected range.

In case there is a negative pressure or vacuum generated due to falling temperatures (e.g. if a car is parked overnight), fuel tank isolation valve (FTIV) opens automatically and allows vacuum seal to open and connect the fuel tank with canister to maintain the vehicle tank pressure in a protected range.

The fuel tank isolation valve (FTIV) also enables fuel vapor containment in the fuel tank until conditions are appropriate for the engine to process the excess vapor.

At present, conventional fuel tank isolation valves (FTIV), have separate sealing for over-pressure and over-vacuum relief function. Further, a sealing feature is provided in the Nozzle Tank itself to separate the Tank and canister chamber to provide the OPR and OVR sealing separately. This leads to the over dependency on individual parts, while the valve is under operation.

Further, having a separate guide for guiding of over pressure seal and over vacuum seal, there are chances of misalignment after a certain period of operation which may cause leakage and hinder the required performance. Further, this may lead to malfunctioning of OPR and OVR function.

Further, in electric part of conventional fuel tank isolation valve (FTIV), immersion of gasoline is only restricted by the over molding of the solenoid coil and its connection terminals. However, it is a well-known fact and widely accepted that, because of various factors like accumulation of gas around over molded piece and/or inside mold tool, improper raw material, bad surface finish of solenoid coil body part leads to the improper sealing between the plastic molded piece and solenoid coil body jeopardizes the safety of a piece and the overall vehicular safety.

Hence there is a technological gap, wherein there is a need for advancement in achieving low emission vehicle with a robust and leakage proof design of a fuel tank isolation valve (FTIV).

OBJECT OF THE INVENTION

The main object of present invention is to reduce number of sealing zones by using a common seal for OPR and OVR function in the fuel tank isolation valve (FTIV) which enhances product life and efficiency by reducing the leakage point, making internal flow better because there is no restriction in the flow path, decreases criticality of the product from manufacturing to assembly and provides a low cost solution due to lesser number of parts.

Yet another objective of present invention is to provide guiding of flow limiter on the same axis as the seal sub-assembly, so that both the parts (seal sub-assembly and flow limiter) move on the single axis during operation.

Yet another objective of present invention is to eliminate the misalignment of over-pressure relief (OPR) and/or over-vacuum relief sealing with respect to sealing zones, for this flow limiter is guided on the coaxial shaft which is assembled with seal sub assembly.

Yet another objective of present invention is to provide a shaft in the fuel tank isolation valve (FTIV) to increase the guiding length of the flow limiter to reduce the chances of misalignment of the parts during operation of FTIV.

Yet another objective of present invention is to restrict the exposure of the gasoline in the solenoid coil of fuel tank isolation valve (FTIV) by incorporating O-Rings in the solenoid coil which is then over molded, resulting in reduced leakage and making it a robust leak proof design.

Yet another objective of present invention is to restrict the gasoline leakage from the terminal area of the fuel tank isolation valve (FTIV) by providing a terminal seal which is then over molded, thereby further reducing the chances of leakage and making it a robust leak proof design.

SUMMARY OF THE INVENTION

The present invention provides an improved fuel tank isolation valve. In particular, the invention is directed to a modified fuel tank isolation valve where the over-pressure relief (OPR) and over-vacuum relief (OVR) sealing function is performed with a common seal. Further, a method is provided to eliminate the misalignment of over-pressure relief (OPR) and over-vacuum relief (OVR) sealing with respect to sealing zones and thereby avoid gasoline leakage and immersion into/from the fuel tank isolation valve (FTIV) body.

In an embodiment of present invention, a fuel tank isolation valve (FTIV) includes a housing sub-assembly comprising solenoid coil; a compression spring fixed inside the housing sub assembly to perform over vacuum relief (OVR) function; a seal sub-assembly; a shaft assembled with seal sub-assembly for inline guiding of flow limiter; a nozzle body provided with mounting holes and plurality of nozzles mounted over housing sub-assembly to be connected to the fuel tank and canister of the vehicle; a compression spring fixed over flow limiter to perform overpressure relief (OPR) function, a stroke limiter mounted after the flow limiter inside the nozzle body to control the maximum flow by controlling operating stroke of flow limiter and a cover to close the nozzle body.

In another embodiment of present invention, Over Pressure Relief (OPR) and Over Vacuum Relief (OVR) functions are controlled using a common seal. A flow limiter is customized so that a sealing seat is provided to eliminate the rubber seal required to perform the OPR function by a separate seal thus reducing the sealing points.

In another embodiment of present invention, includes guiding of the flow limiter in such a way so that the sealing seat of flow limiter is always parallel to the sealing surface of the seal sub-assembly which helps to seal and open the FTIV again on the similar points to get the repeatability.

In another embodiment of present invention, a flow limiter is coaxially guided on a shaft which is assembled with seal sub-assembly to provide the sufficient guiding length according to the diameter of flow limiter, thereby overcoming misalignment of flow limiter with respect to sealing surface during operation.

In another embodiment of present invention, in housing sub-assembly, O-rings are added in the solenoid coil and then over moulded to make it robust and leak proof design.

In another embodiment of present invention, in housing sub-assembly, a terminal seal is assembled on the terminals in the solenoid coil before the over molding process to avoid the gasoline leakage from the terminals zone of the FTIV and to make it a robust leak proof design.

BRIEF DESCRIPTION OF THE DRAWINGS

The present invention will be described with reference to the following drawings. The drawings and the associated descriptions are provided to illustrate embodiments of the invention and not to limit the scope of the invention.

DETAILED DESCRIPTION OF THE INVENTION

Figure 1:
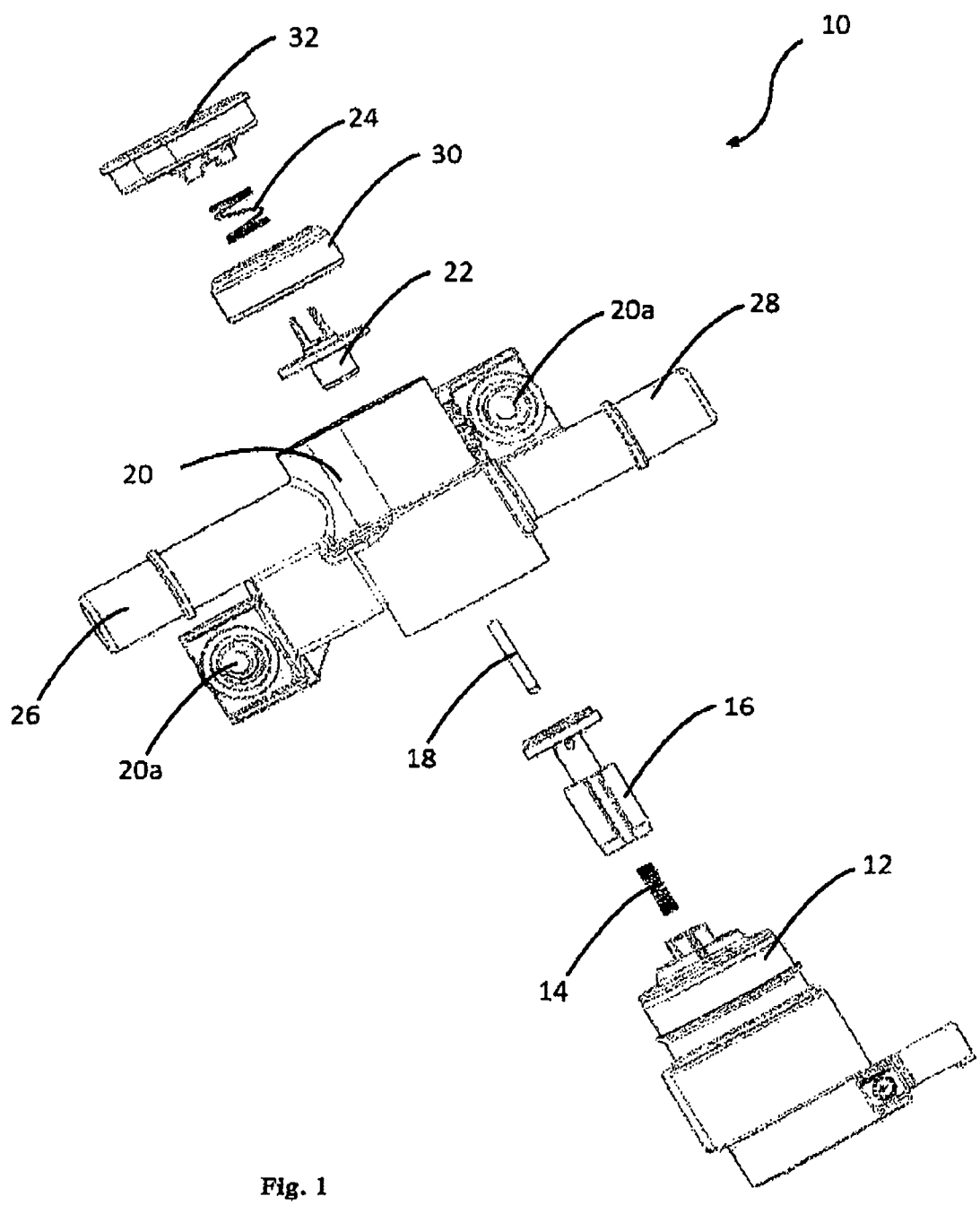
FIG. 1 is an exploded view of a fuel tank isolation valve (FTIV) in accordance with an embodiment of the present invention.

Many aspects of the invention can be better understood with references made to the drawings below. The components in the drawings are not necessarily drawn to scale. Instead, emphasis is placed upon clearly illustrating the components of the present invention. Moreover, like reference numerals designate corresponding parts through the several views in the drawings. Before explaining at least one embodiment of the invention, it is to be understood that the embodiments of the invention are not limited in their application to the details of construction and to the arrangement of the components set forth in the following description or illustrated in the drawings. The embodiments of the invention are capable of being practiced and carried out in various ways. In addition, the phraseology and terminology employed herein are for the purpose of description and should not be regarded as limiting.

In one embodiment of present invention provides a fuel tank isolation valve (FTIV) which includes a system with lesser number of sealings and method to eliminate the misalignment of over-pressure relief (OPR) and over-vacuum relief (OVR) sealing with respect to sealing zones. Further, system and method are provided to avoid gasoline leakage and immersion into/from the fuel tank isolation valve (FTIV) body.

Now referring to FIG. 1, in an embodiment of the present invention provides a fuel tank isolation valve (FTIV) 10 comprising a housing sub-assembly 12 which includes a solenoid coil inside it, a compression spring 14 for over-vacuum relief (OVR) function, a seal sub-assembly 16, a shaft 18 assembled with seat sub-assembly 16 for inline guiding of flow limiter 22, a nozzle body 20 provided with mounting holes 20a and nozzle 28 to be connected to tank and nozzle 26 to be connected to canister of the vehicle, mounted over housing sub-assembly 12 and sealed by seal sub-assembly 16, a compression spring 24 for OPR function fixed over flow limiter 22 which perform over-pressure relief function, a stroke limiter 30 mounted after flow limiter 22 inside the nozzle body 20 to control the maximum flow by controlling operating stroke of flow limiter 22 and a cover 32 to close the valve and maintains the installation height of the compression spring for over-pressure relief function.

Figure 2:
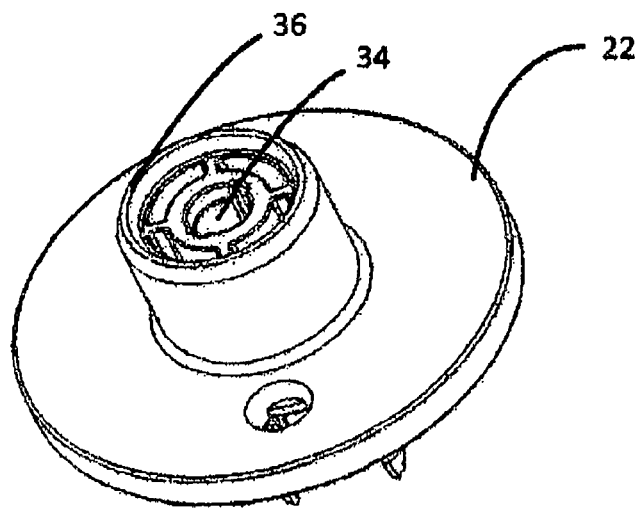
FIG. 2 is a perspective view of flow limiter in accordance with an embodiment of the present invention.

Now referring to FIG. 2, in an embodiment of present invention a flow limiter 22 is provided. Further, flow limiter 22 is provided with a guiding hole 34 for guiding of shaft 18 into it, and an integrated sealing seat 36 which perform the OPR function. Flow limiter will be assembled inside the nozzle body 20.

Figure 3:
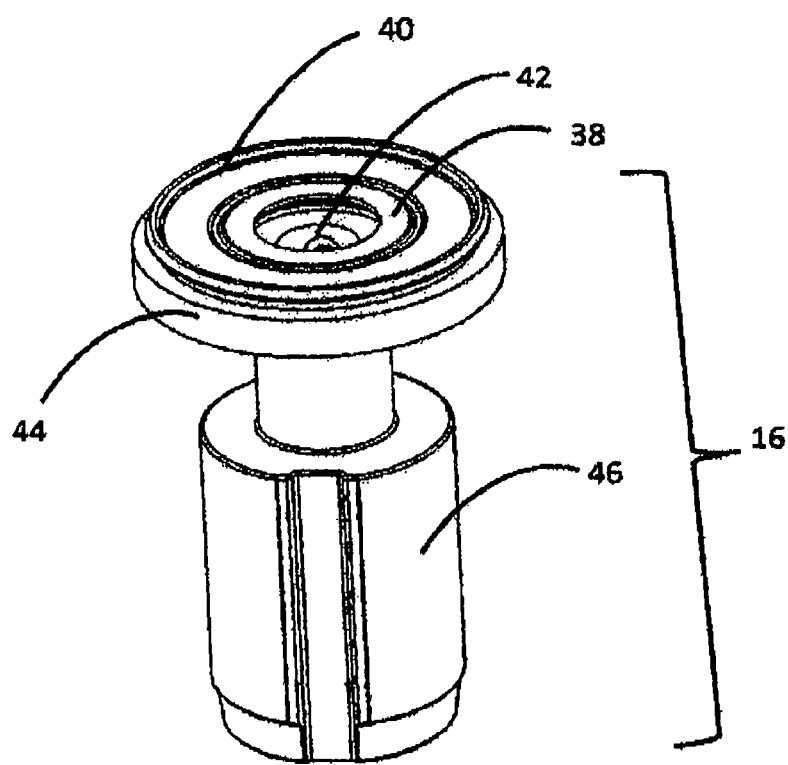
FIG. 3 is a perspective view of seal sub-assembly in accordance with an embodiment of the present invention.

Now referring to FIG. 3, in an embodiment of present invention, the invention provides an arrangement of seal sub-assembly 16. As shown the sealing surface 38 is for OPR function and sealing surface 40 is for OVR function of seal sub-assembly 16. Seal sub-assembly 16 also incorporates a hole 42 for assembly of the shaft 18. The rubber seal 44 is over molded on the moving plunger 46. Rubber seal 44 is a common seal far both OPR and OVR Function.

Figure 4A:
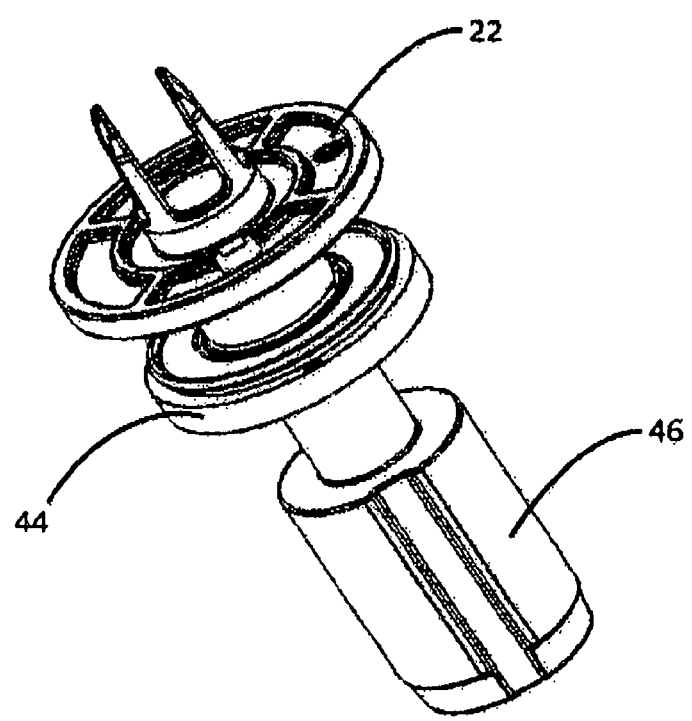
FIG. 4A is an exploded view.
Figure 4B:
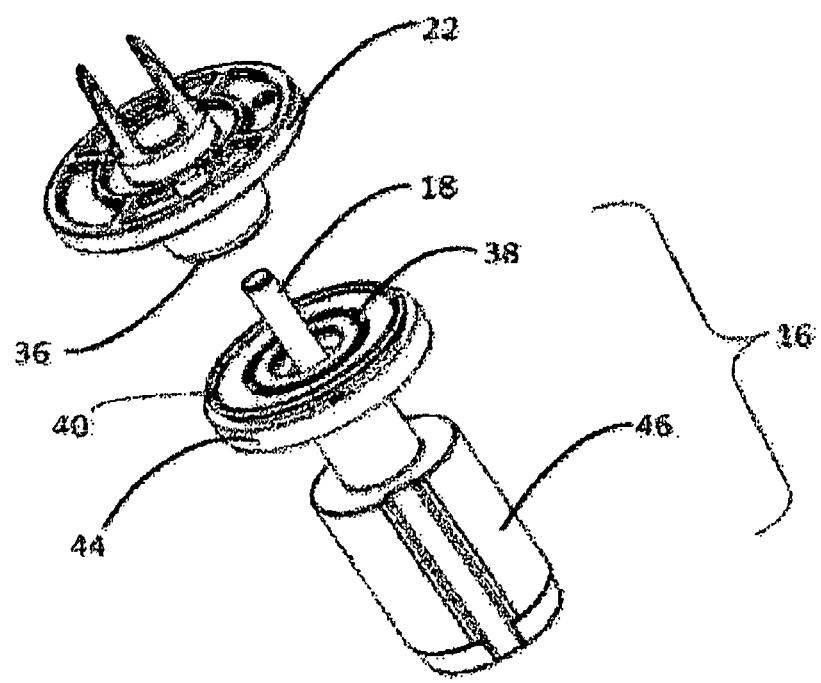
FIG. 4B is a perspective view and FIG. 4C is the sectional view showing seal sub-assembly, shaft and flow limiter in accordance with an embodiment of the present invention.
Figure 4C:
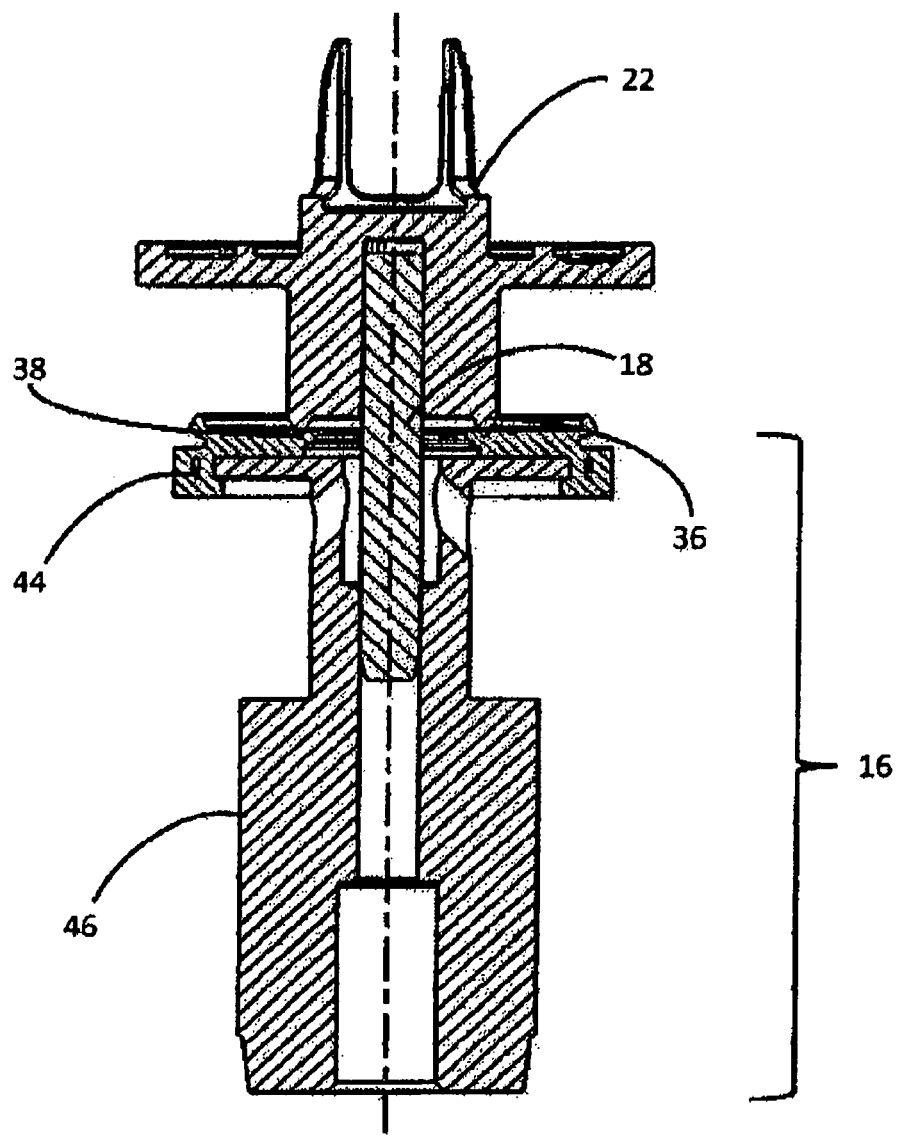

Now referring to FIGS. 4A, 4B and 4C, in one embodiment of present invention provides an arrangement of seal sub-assembly 16, shaft 18 and flow limiter 22. As shown the shaft 18 is assembled coaxially inside hole 42 of moving plunger 46 of seal sub assembly 16 and then flow limiter 22 is guided over the shaft 18 through guiding hole 34 in such a way as to maintain the parallelism of sealing seat 36 with respect to the sealing surface 38 of rubber seal 44 during and after the operation. Further, this helps in overcoming the problem of misalignment of flow limiter 22 with respect to sealing surface 38 during and after the operation.

Figure 5:
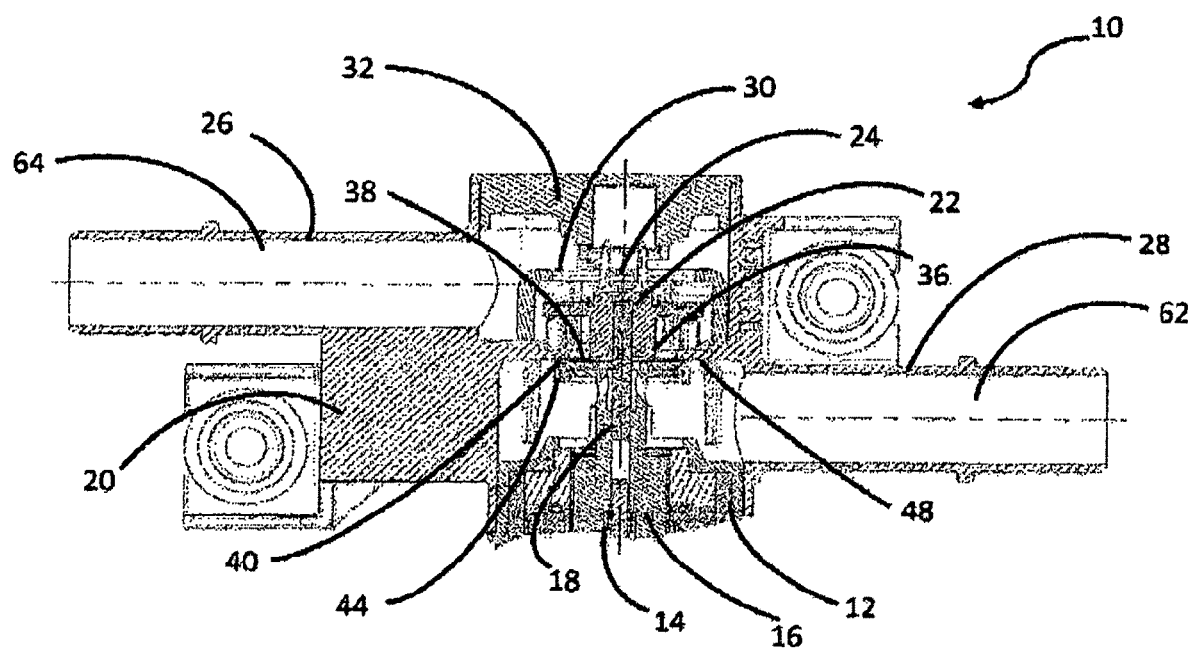
FIG. 5 is a sectional view showing a housing sub assembly, a compression spring for OVR function, a seal sub-assembly, a shaft, a flow limiter, a Nozzle Body, a compression spring for OPR function and a cover in accordance with an embodiment of the present invention.

Now referring to FIG. 5, in an embodiment of present invention, the invention provides arrangement of housing sub-assembly 12, seal sub-assembly 16, shaft 18, nozzle body 20 and flow limiter 22 within the fuel tank isolation valve 10 (FTIV). Housing sub-assembly 12 incorporates a seal sub-assembly 16 with a compression spring 14. A nozzle body 20 is attached to housing sub-assembly 12 along with seal sub-assembly 16 and compression spring 14 by means of such as, but not limited to laser welding, etc. wherein sealing surface 40 of rubber seal 44 seals with sealing surface 48 of nozzle body 20 thus blocks the fuel vapor flow path 62 of nozzle 28 to perform over-vacuum relief function. Further, a flow limiter 22 having an integrated sealing seat 36 is inserted into shaft 18, integrated sealing seat 36 is in contact with sealing surface 38 of rubber seal 44 to perform over-pressure relief function by creating a block to fuel vapor flow path 64 of nozzle 26. A stroke limiter 30 and another compression spring 24 is mounted over flow limiter 22 to control the maximum flow by controlling operating stroke of flow limiter 22. A cover 32 is fixed to nozzle body 20 by means of such as, but not limited to laser welding, etc. to make fuel tank isolation valve 10 (FTIV) a closed leak proof assembly. During the operation of FTIV 10, the flow limiter 22 always move on the same axis of seal sub assembly 16 as they are guided on by the shaft 18 which is coaxially assembled with the seal sub assembly 16.

Figure 6:
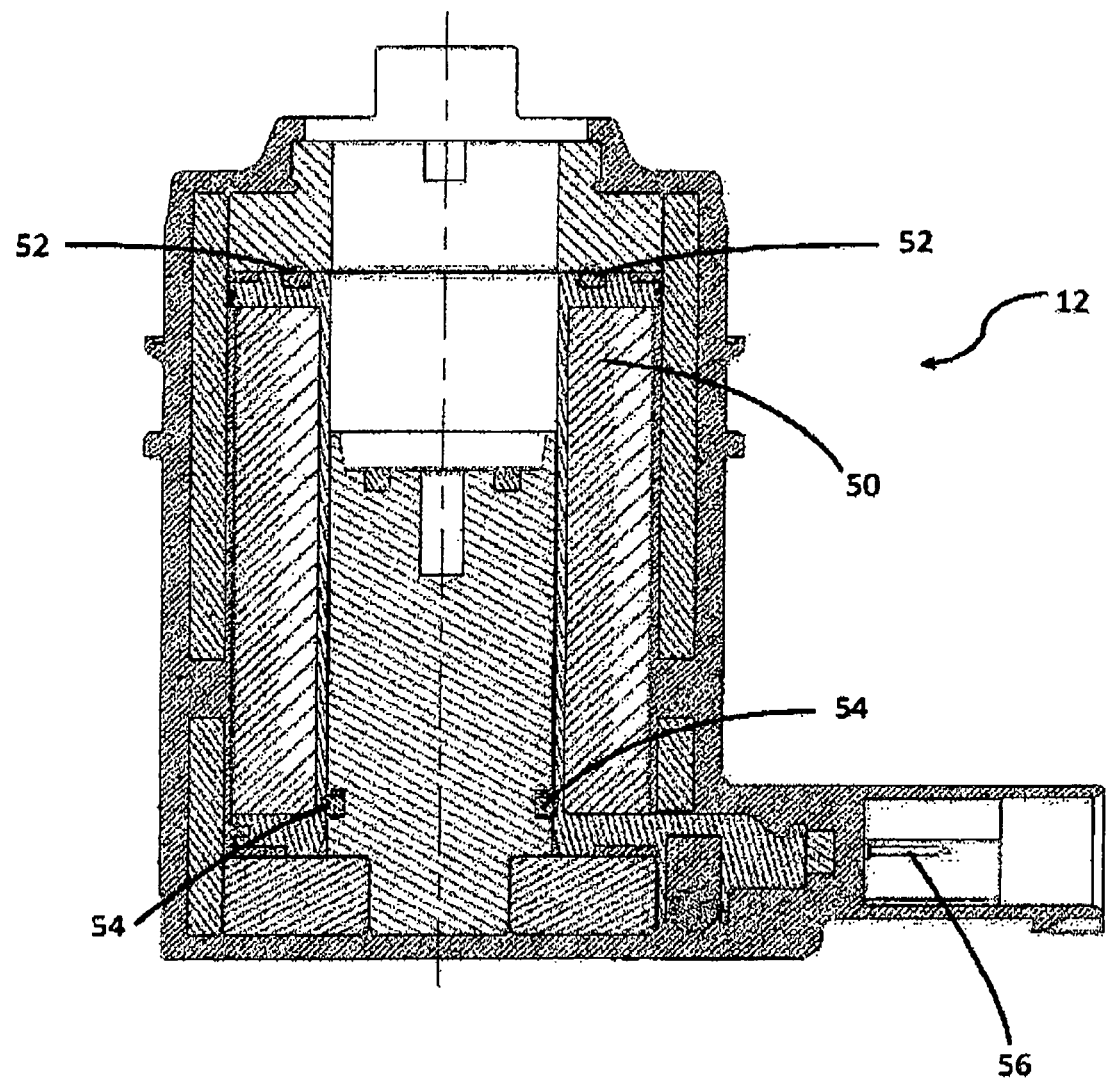
FIG. 6 is a sectional view of housing sub-assembly in accordance with an embodiment of the present invention.

Now referring to FIG. 6, in an embodiment of present invention provides a housing sub-assembly 12 which is generally circular in shape and includes a solenoid coil 50 with terminal pins 56 inside it. As shown, o-ring 52 and o-ring 54 are placed at top and bottom grooves of the solenoid coil 50 in such a way that leakage and immersion of fuel inside solenoid coil 50 is restricted.

Figure 7:
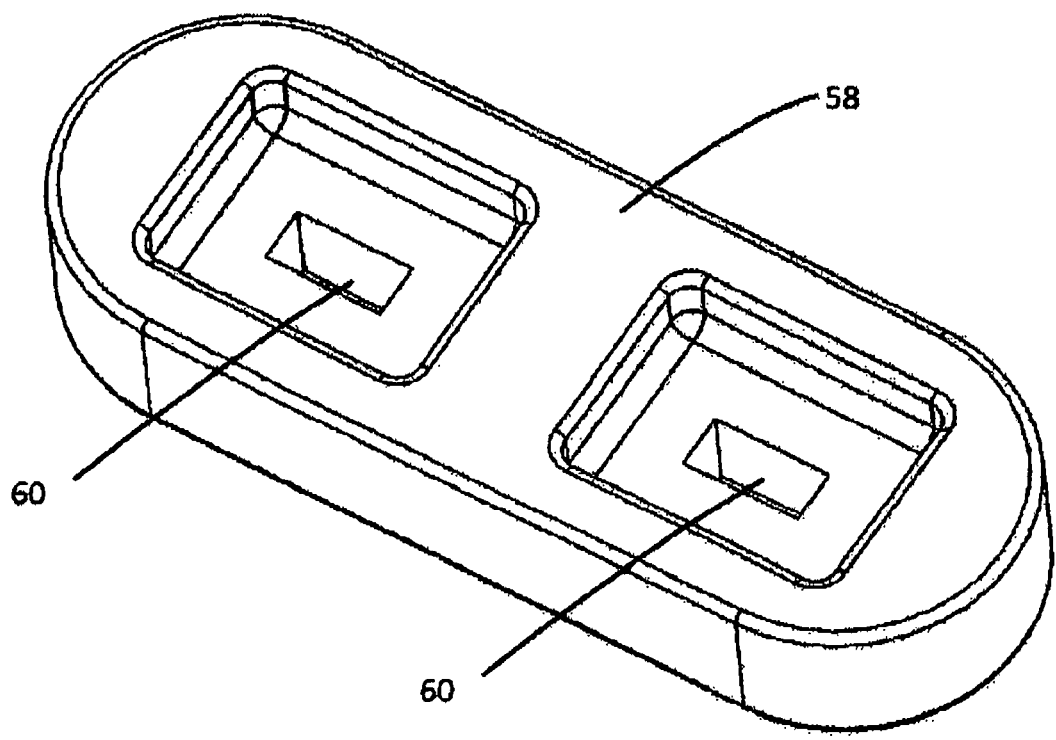
FIG. 7 is a perspective view of terminal seal in accordance with an embodiment of the present invention.

Now referring to FIG. 7, in an embodiment of present invention provides a terminal seal 58 made up of a rubber material which incorporates holes 60 for terminal pin 56. This, terminal seal 58 restricts the immersion of fuel into the solenoid coil 50 from electrical terminals.

Figure 8A:
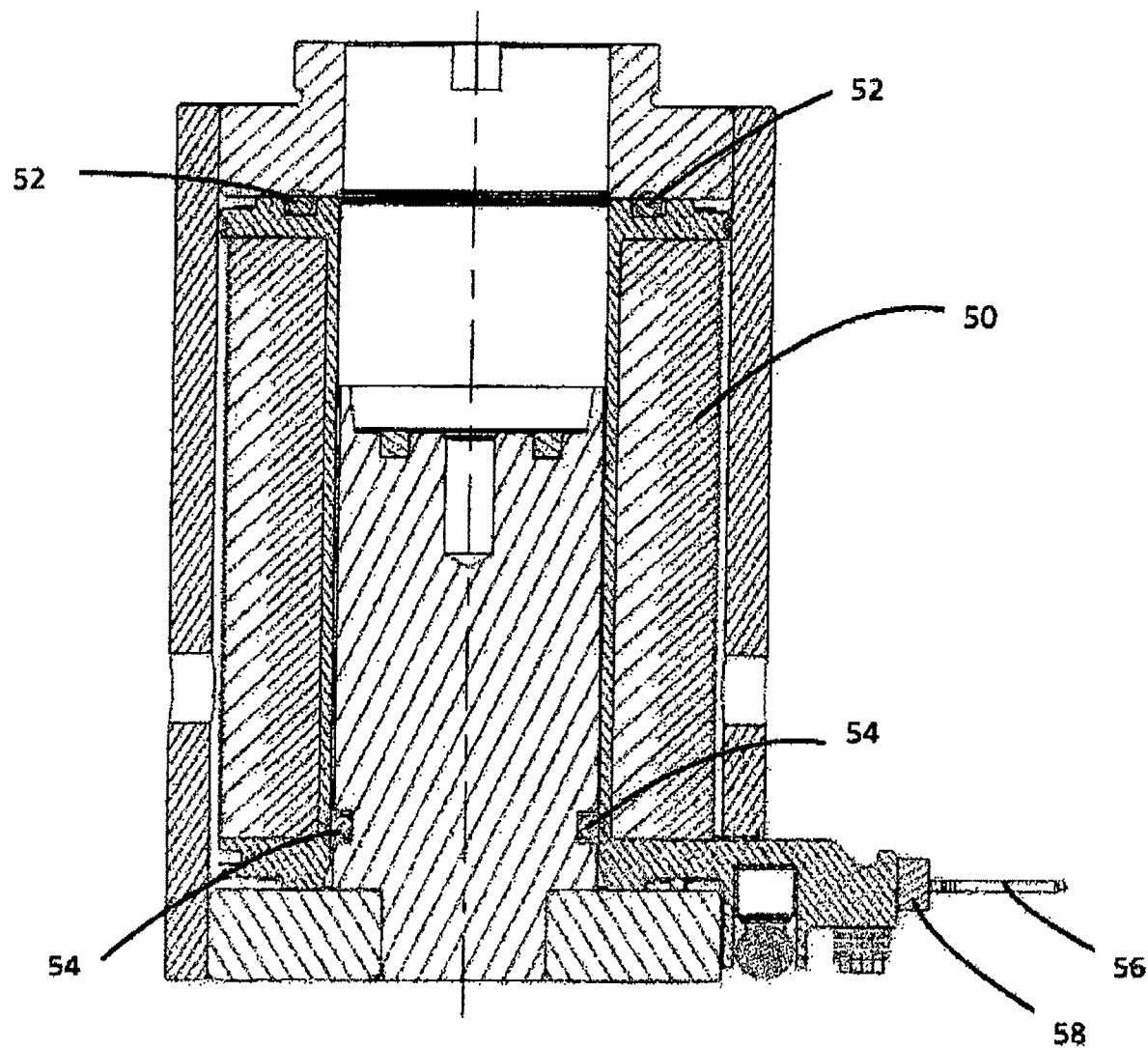
FIG. 8A and FIG. 8B are sectional and perspective view of solenoid coil in accordance with an embodiment of the present invention.
Figure 8B:
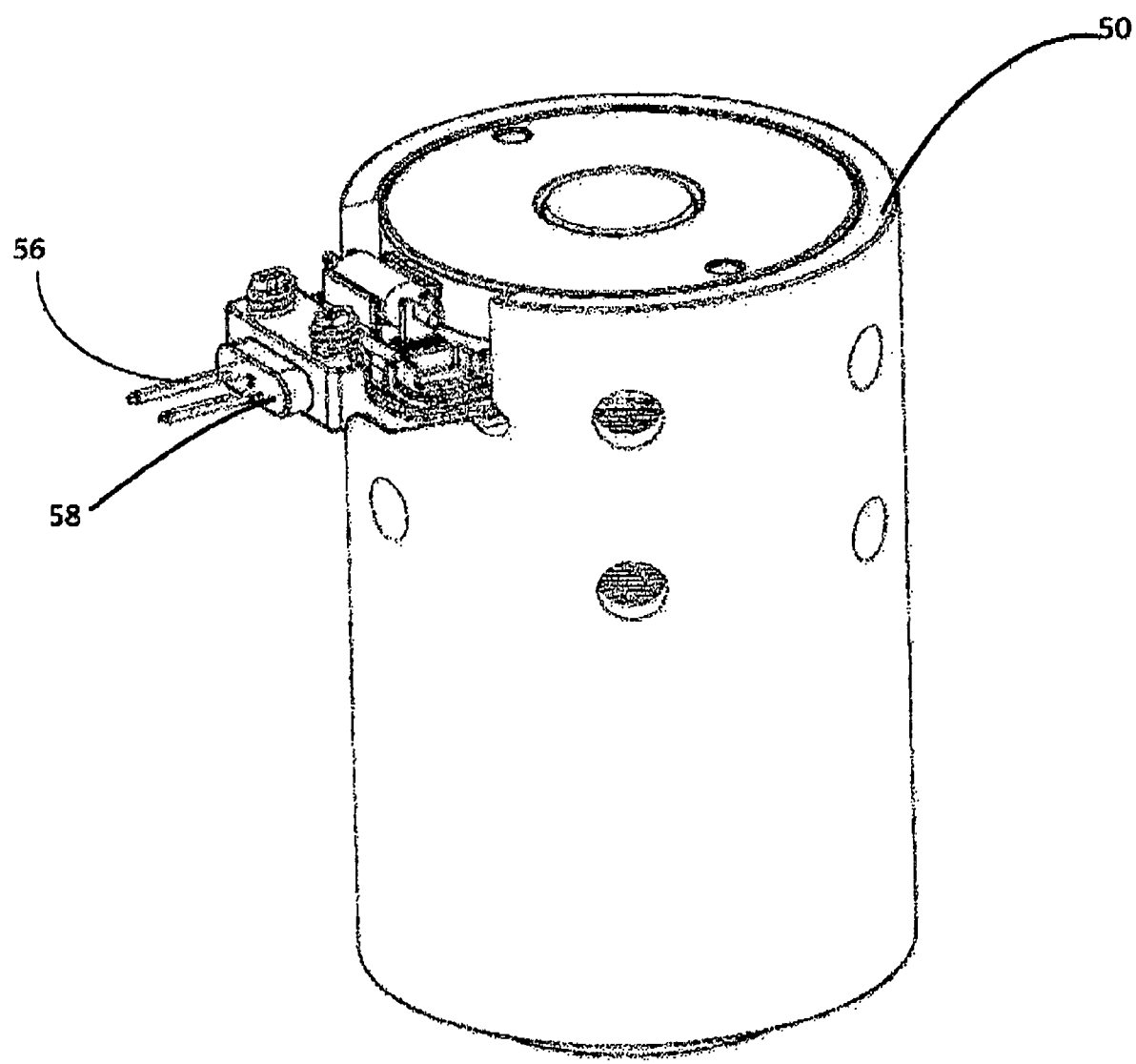

Now referring to FIGS. 8A and 8B, in an embodiment of present invention provides an arrangement of terminal seal 58 with terminal pin 56 of solenoid coil 50. O-ring 52 and o-ring 54 is placed inside their respective grooves of solenoid coil 50 in such a way that leakage and immersion inside solenoid coil 50 is restricted after over molding and making it a robust leak proof design.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated.

We claim:

1. A fuel tank isolation valve (10), comprising:
    a housing sub-assembly (12) including a solenoid coil (50) and compression spring (14) for over-vacuum relief (OVR) function;
    a shaft (18) assembled with a seal sub-assembly (16) for inline guiding of a flow limiter (22);
    a nozzle body (20) provided with a plurality of mounting holes (20a) a nozzle (28) connected to a fuel tank via a fuel vapour flow path (62) and a nozzle (26) connected to a canister via a fuel vapour flow path (64), said nozzle body (20) mounted over a housing sub-assembly (12) and sealed by said seal sub-assembly (16);
    a compression spring (24) for over-pressure relief function fixed over the flow limiter (22) which performs over-pressure relief function;
    a stroke limiter (30) mounted after the flow limiter (22) and inside the nozzle body (20) to control the maximum flow by controlling operating stroke of the flow limiter (22); and
    a cover (32) to close the valve (10) and maintains installation height of the compression spring (24) for over-pressure relief function;
    wherein,
    the flow limiter (22) is provided with an integrated sealing seat (36) and a guiding hole (34);
    the seal sub-assembly (16) comprises of a plunger (46) with a guiding hole (42) and an over molded rubber seal (44) having a sealing surface (38) for over-pressure relief function and a sealing surface (40) far over-vacuum relief function;
    the shaft (18) maintains the sealing seat (36) in parallel with respect to the sealing surface (38) of the rubber seal (44) and avoids misalignment of the flow limiter (22) with respect to the sealing surface (38);
    the sealing surface (40) of the rubber seal (44) of the seal sub-assembly (16) seals with the surface (48) of the nozzle body (20);
    the stroke limiter (30) controlling the maximum flow by controlling operating stroke of the flow limiter (22);
    the solenoid coil (50) have an o-ring (52) and an o-ring (54) placed at top and bottom grooves in a way that leakage and immersion of fuel inside the solenoid coil (50) is restricted after over molding of the housing sub-assembly (12); and
    the solenoid coil (50) have a terminal seal (58) with a terminal pin (56) in a way that leakage and immersion of fuel inside the solenoid coil (50) is restricted by the terminal pin after over molding of the housing sub-assembly (12).

2. The fuel tank isolation valve (10) as claimed in claim 1, wherein the fuel tank isolation valve (10) obviates misalignment of over-pressure relief and over-vacuum relief sealing with respect to sealing zones and thereby avoiding fuel leakage.

3. The fuel tank isolation valve (10) as claimed in claim 1, wherein the flow limiter (22) is customized to provide a sealing seat (36) to obviate requirement of separate rubber seal required to perform the over-pressure relief (OPR) function thus reducing number of sealing points.

4. The fuel tank isolation valve (10) as claimed in claim 1, wherein guiding of the flow limiter (22) is always parallel to the sealing surface (38) of the seal sub-assembly (16) to seal and open the fuel tank isolation valve (10).

5. The fuel tank isolation valve (10) as claimed in claim 1, wherein the flow limiter (22) is coaxially guided on the shaft (18) assembled with the seal sub-assembly (16) thereby obviating misalignment of the flow limiter (22) during operation.

6. The fuel tank isolation valve (10) as claimed in claim 1, wherein the fuel tank isolation valve (10) obviates requirement of additional rubber seal required for performing the over-pressure relief (OPR) function.

\* \* \* \* \*